Nov. 3, 1931.  J. A. FITCH  1,830,535
VIBRATION DAMPENING DEVICE
Filed March 12, 1930
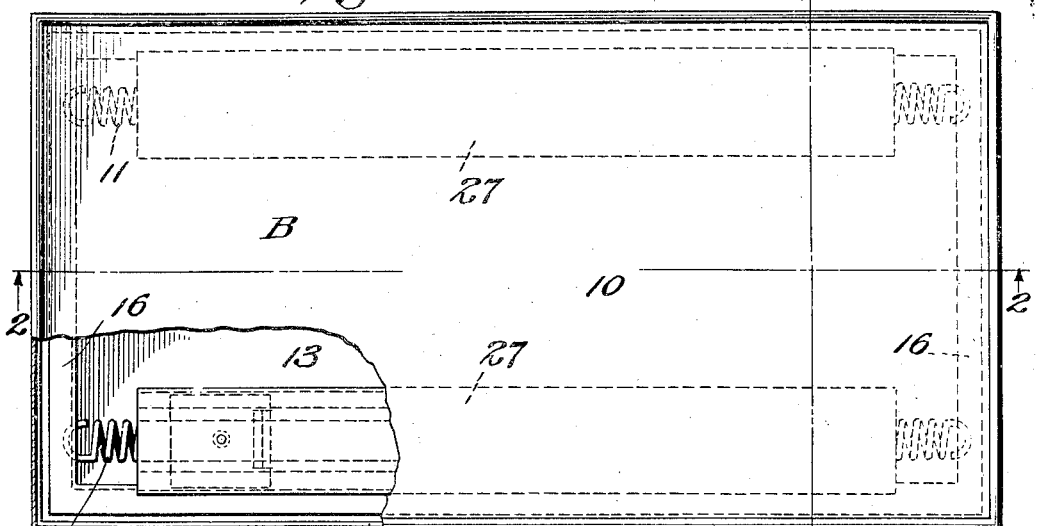
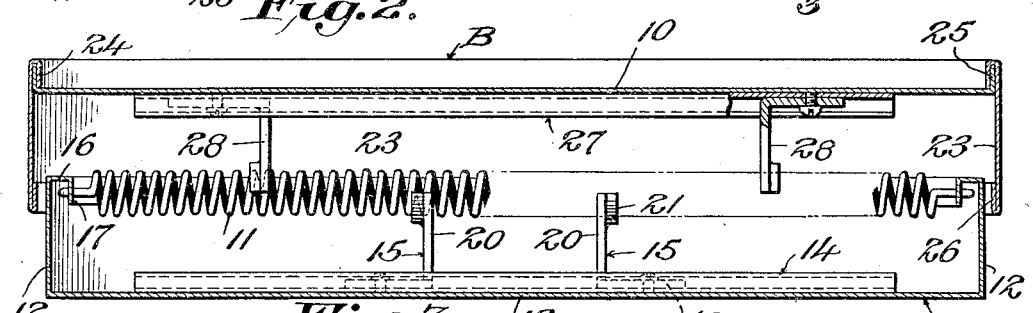
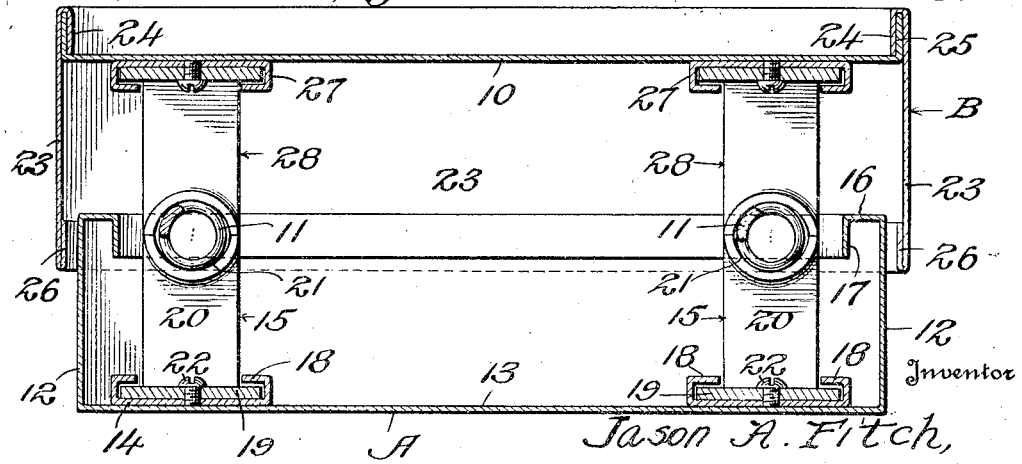
Inventor
Jason A. Fitch,
By D. P. Wolhaupter
Attorney Patented Nov. 3, 1931

1,830,535

UNITED STATES PATENT OFFICE

JASON A. FITCH, OF YOUNGSTOWN, OHIO, ASSIGNOR TO THE GENERAL FIREPROOFING COMPANY, OF YOUNGSTOWN, OHIO, A CORPORATION OF OHIO

VIBRATION DAMPENING DEVICE

Application filed March 12, 1930. Serial No. 435,227.

This invention relates to a vibration dampening device capable of general use but particularly adapted as a support for transcribing machines and the like, and has for its general object to provide a vibration dampening support which is of simple, inexpensive construction and which is thoroughly reliable and efficient in use.

In many instances the center of gravity of a transcribing machine or the like is located remote from the geometrical center of the machine, and in this connection it is a more specific object of the invention to provide a vibration dampening support inclusive of adjustable means whereby a machine may be supported to most effectively eliminate vibration thereof irrespective of the location of the center of gravity of the machine relative to its geometrical center.

With the foregoing and other objects in view, the invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 1 is a top plan view, partly broken away, of a vibration dampening support embodying the novel and essential features of the invention.

Figure 2 is a longitudinal section taken approximately on the line 2—2 of Fig. 1; and Figure 3 is a transverse section taken approximately on the line 3—3 of Fig. 1.

According to the specific embodiment of the invention illustrated in the drawings, a base A in the form of an open top, box-like structure is provided, over which is disposed an open bottom, box-like structure B, the top 10 of which constitutes a platform on which a transcribing machine or the like is adapted to rest.

A plurality of coil springs 11 are stretched between opposite side or end walls 12, 12 of the base A, near the top thereof, in spaced, preferably parallel relation, and on the bottom 13 of said base, below each spring 11 and extending contiguous therewith, is secured a guide member 14 for a plurality of adjustable spring supports 15.

In the present instance the upper marginal portions of the sides and ends of the base A are turned laterally inward and then downward as indicated at 16 and 17, respectively, to provide stiff reinforcing formations or ribs at the open top of said base to hold the said sides and ends thereof against inward deformation under the influence of load imposed on the springs 11, and the downturned portions 17 of said reinforcements are utilized as a means of attaching the ends of the springs 11 to opposite walls of the base. That is to say, said downturned portions are apertured and the ends of the springs 11 are provided with hook formations engaged through said apertures. As will be understood, however, this merely constitutes one convenient and practical means of securing the ends of the springs to opposite walls of the base, the said springs, if desired, being secured to said walls in any other suitable manner.

The guide members 14 and the spring supports 15 may be of any suitable construction. Preferably, however, each guide member is of channel or substantially U-shaped cross section having an inturned marginal flange 18 at the top of each of the sides thereof, thereby providing a slot of substantially inverted T-shape.

The spring supports 15 preferably are duplicates of one another. Each consists of a base plate 19 and an arm 20 extending at right angles therefrom and formed at its free end with a U-shaped spring seat 21 which is preferably of sufficient width to engage two or more coils of a spring 11.

As shown in the drawings, the bases 19 of the spring supports are adapted to be slidably engaged in the slots of the guide members 14 with their arms 20 extending upward into supporting engagement with the springs 11, the latter resting within the spring seats 21. One or more of the spring supports 15 may be associated with each guide member and its related spring, and each spring support preferably is inclusive of a set screw or the like 22 for securing same in a desired position of adjustment along its related guide member, the latter being secured to the bottom 13 of the base A by welding or in any other suitable or desired manner.

The box-like structure B is of slightly larger size than the box-like base structure A so as to be telescopically movable with respect to the latter structure, and said box-like structure B may be of any suitable construction. Preferably, however, the sides and ends 23 thereof are formed separate from the top or platform portion 10 and are turned inwardly and downwardly, as indicated at 24, into embracing relation to an upwardly directed marginal flange 25 of said top or platform portion, thereby to stiffen and reinforce said structure at the top thereof, and for a similar purpose the lower marginal portions of the sides and ends 23 preferably are turned inward upon themselves as indicated at 26.

Upon the inner face of the top 10 are secured a number of guide members 27 in all respects duplicates of the guide members 14, and in these guide members 27 are adjustably mounted spring engaging members 28 in all respects duplicates of the spring supports 15, the arrangement of said guide members 27 being such that they extend in overlying relation to the springs 11, respectively, when the box-like structure B is operatively disposed above the base A.

In view of the foregoing it will be apparent that when the box-like structure B is operatively disposed above the base A the former will be yieldably supported through the instrumentality of the spring engaging members 28 upon the springs 11, whereby the latter will serve to absorb substantially all vibration resulting from operation of a transcribing or similar machine mounted on top of the platform 10.

As is obvious, the provision for adjustment of the spring supporting and spring engaging members 15, 28 of the structures A and B, respectively, enables the springs 11 to be maintained in substantially uniform tension throughout their lengths irrespective of the distribution of weight upon the platform 10, thereby to provide for most effective vibration eliminating functioning of the device in any particular instance.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A vibration dampening device comprising a base inclusive of a bottom having a pair of spaced spring attaching members rising therefrom, a coil spring stretched between said members above the bottom, a guide member mounted on said base beneath said spring and extending contiguous to the latter, a spring support mounted upon said guide member and adjustable therealong so as to underlie and support different portions of said spring, and an object supporting platform supported upon said spring.

2. A vibration dampening device comprising a base inclusive of a bottom having a pair of spaced spring attaching members rising therefrom, a coil spring stretched between said members above the bottom, a channeled guide member mounted on said base beneath said spring and extending contiguous to the latter, a spring support mounted upon said guide member and adjustable therealong so as to underlie and support different portions of said spring, means for securing said spring support in any position of adjustment thereof along said guide member, and an object supporting platform supported upon said spring.

3. A vibration dampening device comprising a pair of spaced spring attaching members, a coil spring stretched between said members, a platform disposed above said spring, a guide member mounted on said platform and extending contiguous to said spring, and a spring engaging member mounted on said guide member for adjustment therealong, said spring engaging member being inclusive of a depending arm provided at its lower end with a spring seat.

4. A vibration dampening device comprising a pair of spaced spring attaching members, a coil spring stretched between said members, a platform disposed above said spring, a guide member mounted on said platform and extending contiguous to said spring, and a spring engaging member mounted on said guide member for adjustment therealong, said spring engaging member being inclusive of a depending arm provided at its lower end with a spring seat, and means for securing said spring engaging member in any position of adjustment thereof along said guide member.

5. A vibration dampening device comprising a base inclusive of a bottom having spaced spring attaching members rising therefrom, a plurality of coil springs stretched between said members, a guide member mounted on the base beneath each spring, a plurality of spring supports adjustable along each guide member so as to underlie and support different portions of said springs, respectively, an object supporting platform disposed above said springs, a guide member mounted on said platform in overlying relation to each spring, and a plurality of members mounted on each of said guide members for adjustment therealong and inclusive of arms, respectively, depending into platform supporting engagement with said springs.

In testimony whereof I hereunto affix my signature.

JASON A. FITCH.